US005447044A

United States Patent [19]

Cheng

[11] Patent Number: 5,447,044

[45] Date of Patent: Sep. 5, 1995

[54] APPARATUS FOR LOCKING A NOTEBOOK COMPUTER ON A COMPUTER SUPPORT

[75] Inventor: Samuel Cheng, Hsin-Tien City, Taiwan

[73] Assignee: Manufacturing Technology Resources Inc., Taiwan

[21] Appl. No.: 248,748

[22] Filed: May 25, 1994

[51] Int. Cl.[6] ........................ E05B 73/00; F16B 41/00

[52] U.S. Cl. .......................................... 70/58; 70/232; 70/DIG. 57; 248/552

[58] Field of Search ........... 70/58, DIG. 57, 229–232, 70/159, 164; 248/551, 552; 361/683, 726, 740, 759; 364/708.1

[56] References Cited

U.S. PATENT DOCUMENTS

| | | | |
|---|---|---|---|
| 1,339,075 | 5/1920 | Toelle | 70/232 |
| 1,512,939 | 10/1924 | Ledin | 70/DIG. 57 X |
| 3,514,172 | 5/1970 | Buchman | 70/58 X |
| 3,625,031 | 12/1971 | Alley, III | 70/231 X |
| 4,007,613 | 2/1977 | Gassaway | 70/DIG. 57 X |
| 4,340,376 | 7/1982 | Williams | 70/232 X |
| 4,414,829 | 11/1983 | Nielsen, Jr. et al. | 70/232 X |
| 4,444,031 | 4/1984 | Watson | 70/DIg. 57 X |
| 4,736,603 | 4/1988 | Brushaber | 70/232 |
| 5,051,868 | 9/1991 | Leverault et al. | 361/685 |
| 5,076,079 | 12/1991 | Monoson et al. | 70/58 |

*Primary Examiner*—Lloyd A. Gall

*Attorney, Agent, or Firm*—Ladas & Parry

[57] ABSTRACT

An apparatus for locking a notebook computer on a computer support includes a padlock, an elongated fixing member fastening the padlock to the computer support, and a lock support fastening the padlock to the computer. The computer housing of the computer is of the type having a straight slot and a threaded hole which are formed in the outer surface thereof, and is provided with a built-in bolt member which is engaged within the threaded hole. The lock support has a counterbore through which the bolt member extends. A rib projects from the lock support to engage within the slot of the computer housing so as to prevent rotation of the lock support relative to the computer housing. A shackle hole is formed through the lock support in such a manner that the counterbore and the shackle hole intersect. The shackle of the padlock extends through the shackle hole and covers the head of the bolt member so as to prevent a screwdriver from access to the bolt member.

3 Claims, 2 Drawing Sheets

APPARATUS FOR LOCKING A NOTEBOOK COMPUTER ON A COMPUTER SUPPORT

BACKGROUND OF THE INVENTION

1. Field of the Invention

This invention relates to an apparatus for locking a notebook computer on a computer support.

2. Description of the Related Art

Recently, conventional notebook computers are not provided with a locking apparatus which is capable of securing the same to a support, such as a table, when it is not desired to carry or bring the computer outdoors. Thus, the conventional notebook computers lack protection against theft.

SUMMARY OF THE INVENTION

The main object of this invention is therefore to provide an apparatus for locking a notebook computer on a computer support.

According to this invention, an apparatus is used for locking a notebook computer on a computer support. The computer includes a computer housing of the type having a straight slot and a threaded hole that are formed in the outer surface of the housing, and a bolt member engaged threadably within the threaded hole of the housing. The head of the bolt member has a recess portion which can be rotated by a screwdriver. The apparatus includes a lock support having a counterbore and a shackle hole which are formed therethrough and which intersect each other. The threaded stem of the bolt member extends through the small-diameter portion of the lock support. The head of the bolt member is located within the large-diameter portion of the lock support and has a diameter greater than that of the small-diameter portion of the counterbore so as to fasten the lock support to the computer housing. The lock support further includes a straight rib projecting therefrom to engage within the slot of the computer housing so as to prevent rotation of the lock support relative to the computer housing. The shackle extends through the shackle hole of the lock support and covers the recess portion of the bolt member so as to prevent the bolt member from being driven by the screwdriver. An elongated flexible fixing member is fastened to the padlock at one end portion thereof and to the computer support at the other end portion thereof. When the padlock is opened by an associated key, the padlock can be removed from the lock support so as to permit the screwdriver to access the recess portion of the bolt member, thereby removing the lock support from the computer housing.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
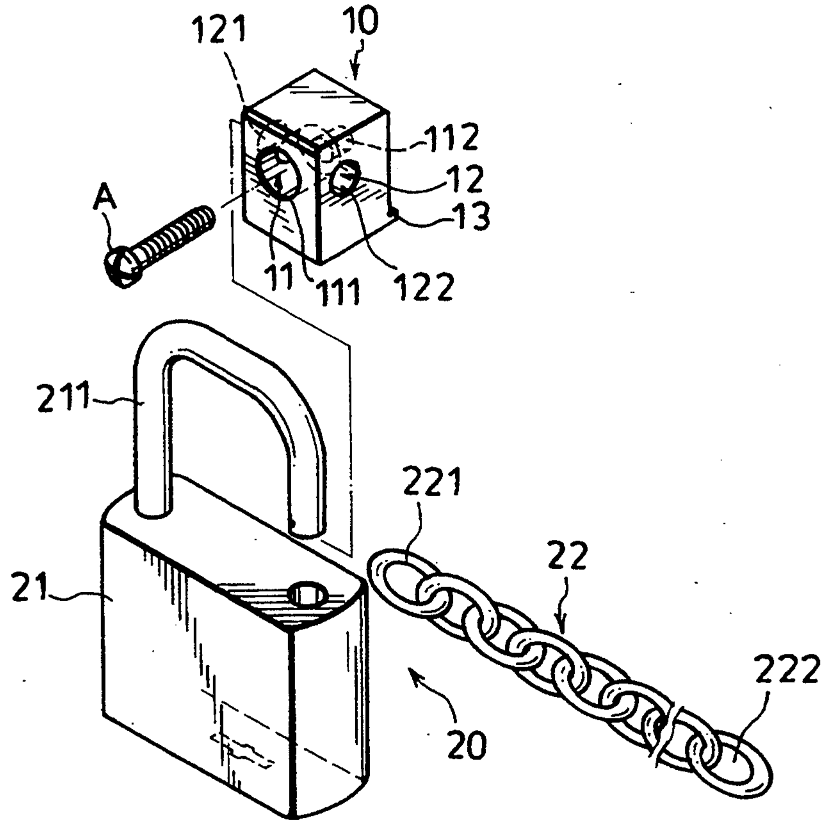
FIG. 1 is an exploded view of an apparatus for locking a notebook computer on a computer support according to this invention.
Figure 2:
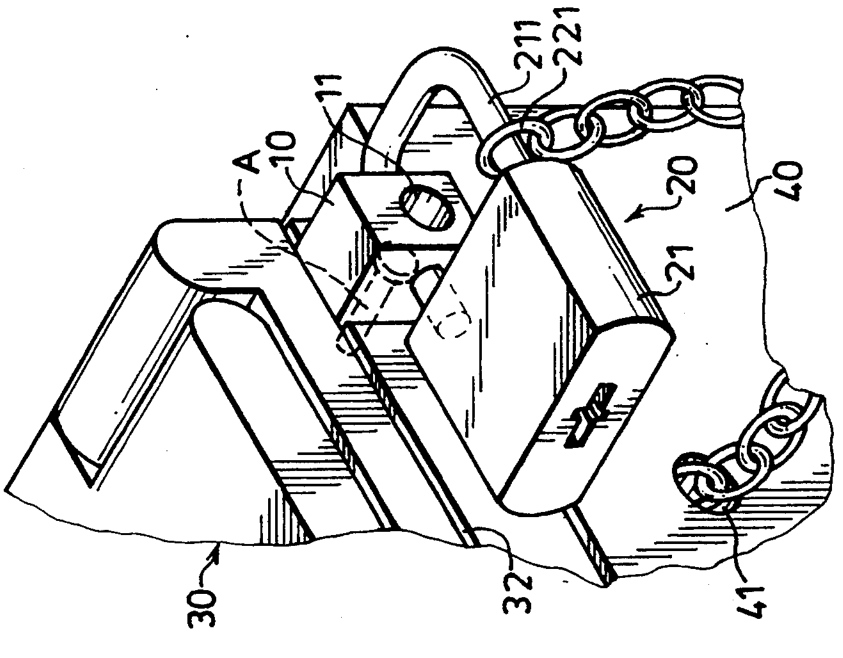
FIG. 2 is a schematic perspective view illustrating the use of the apparatus according to this invention.

Referring to FIGS. 1 and 2, an apparatus of this invention is used for locking the computer housing 30 of a notebook computer on a computer table 40. The computer housing 30 is of the type having a horizontally extending threaded hole 31 (see FIG. 3) and a horizontal straight slot 32 (see FIG. 2) which are formed in the outer surface of the housing 30. In this type of notebook computer, a bolt member (A) is engaged threadably within the threaded hole 31 of the housing 30 for use in mounting a mainboard (not shown) in the housing 30. A recess portion is formed in the head of the bolt member (A) in a known manner so that a screwdriver (not shown) can rotate the same.

The apparatus includes a cubic lock support 10, and a padlock unit consisting of a padlock 21 and an elongated fixing member 22 which has a high strength and which cannot be broken by hand. In this embodiment, the fixing member 22 is a metal chain. The table 40 is hollow. The padlock 21 is fastened to the computer housing 30 by means of the lock support 10 and to the table 40 by means of the chain 22. The chain 22 has a first end ring 221 sleeved on the shackle 211 of the padlock 21, and a second end ring 222 which is confined in the table 40 in a known manner that anyone cannot access the second end ring 222 in a usual state. The hollow table 40 has a front wall through which a chain hole 41 is formed and through which the chain 22 extends.

Figure 3:
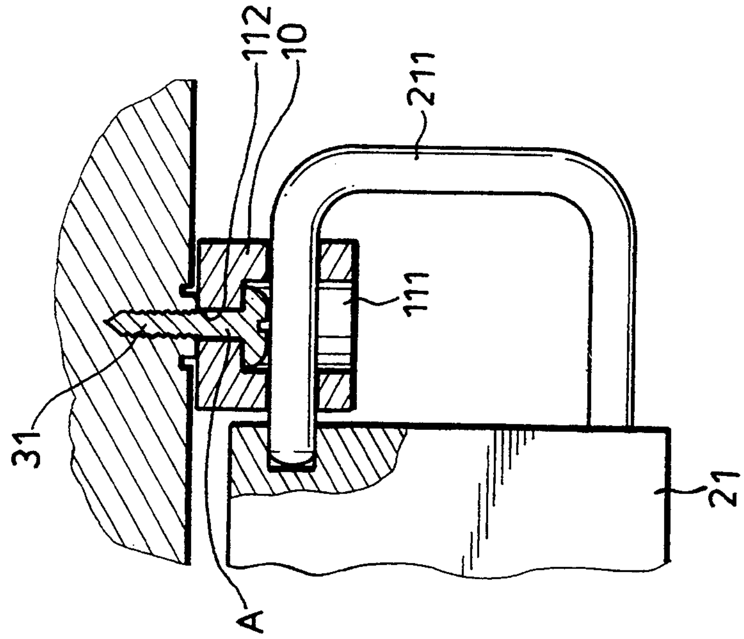
FIG. 3 is a schematic view illustrating how a padlock is fastened to a notebook computer by means of a lock support in accordance with this invention.

As best shown in FIG. 3, the lock support 10 has a horizontal counterbore 11 and a horizontal shackle hole 12 which are formed therethrough and which intersect each other. The counterbore 11 has a large-diameter portion 111 and a small-diameter portion 112. The threaded stem of the bolt member (A) extends through the small-diameter portion 112 of the lock support 10. As illustrated, the head of the bolt member (A) is located within the large-diameter portion of the lock support 10 and has a diameter greater than that of the small-diameter portion 112 of the counterbore 11 so as to fasten the lock support 10 to the computer housing 30. The lock support 10 further includes a horizontal straight rib 13 projecting therefrom to engage within the slot 32 of the computer housing 30 so as to prevent rotation of the lock support 10 relative to the computer housing 30.

The shackle 211 of the padlock 21 extends through the shackle hole 12 of the lock support 10 so as to cover the recess portion of the bolt member (A), thereby preventing a screwdriver from access to the bolt member (A) and preventing removal of the bolt member (A) from the lock support 10, which is screwed to the computer housing 30.

When an associated key is inserted into the lock body of the padlock 21 and opens the same, the padlock 21 can be removed from the lock support 10 so as to permit a screwdriver to rotate the bolt member (A), thereby removing the lock support 10 from the computer housing 30.

With this invention thus explained, it is apparent that numerous modifications and variations can be made without departing from the scope and spirit of this invention. It is therefore intended that this invention is limited only as indicated in the appended claims.

I claim:

1. A lock support for fastening a padlock to a notebook computer, the notebook computer including an outer surface having a straight slot and a threaded hole that are formed therein, and a bolt member engaged threadably within the threaded hole and having a head and a threaded stem, the head of the bolt member having a recess portion which can be rotated by a screwdriver so as to remove said lock support from the notebook computer, the padlock having a lock body and a shackle mounted movably on the lock body, said lock support comprising a counterbore and a shackle hole which are formed therethrough and which intersect each other, said counterbore having a small-diameter portion and a large-diameter portion, the threaded stem of the bolt member extending through said small-diameter portion of said lock support, the head of the bolt member being located within said large-diameter portion of said lock support and having a diameter greater than that of said small-diameter portion of said counterbore so as to fasten said lock support to the notebook computer, said lock support further including a straight rib projecting therefrom to engage within the slot of the notebook computer so as to prevent rotation of said lock support relative to the notebook computer, the shackle of the padlock being capable of being inserted through said shackle hole of said lock support and of being locked within the lock body of the padlock so as to cover the recess portion of the bolt member, thereby preventing a screwdriver from access to the bolt member, whereby, when the padlock is locked on said lock support, said lock support cannot be removed from the notebook computer unless an associated key is used to open the padlock.

2. An apparatus for locking a notebook computer on a computer support, the computer having a computer housing which has a straight slot and a threaded hole that are formed in an outer surface of the housing, and a bolt member engaged threadably within the threaded hole of the housing and having a head and a threaded stem, the head of the bolt member having a recess portion which can be rotated by a screwdriver, said apparatus comprising:

a lock support having a counterbore and a shackle hole which are formed therethrough and which intersect each other, said counterbore having a small-diameter portion and a large-diameter portion, the threaded stem of the bolt member extending through said small diameter portion of said lock support, the head of the bolt member being located within said large-diameter portion of said lock support and having a diameter greater than that of said small-diameter portion of said counterbore so as to fasten said lock support to the computer housing, said lock support further including a straight rib projecting therefrom to engage within the slot of the computer housing so as to prevent rotation of said lock support relative to the computer housing;

a padlock having a lock body and a shackle having two end portions which are locked within said lock body, said shackle extending through said shackle hole of said lock support and covering the recess portion of the bolt member so as to prevent the bolt member from being driven by the screwdriver; and an elongated flexible fixing member fastened to said padlock at one end portion thereof and to the computer support at the other end portion thereof;

whereby, when said padlock is opened by an associated key, said padlock can be removed from said lock support so as to permit the screwdriver to access the recess portion of the bolt member, thereby removing said lock support from the computer housing.

3. An apparatus as claimed in claim 2 wherein said fixing member includes a metal chain having an end ring sleeved on said shackle.

* * * * *